(12) United States Patent
Martin (10) Patent No.: US 6,755,080 B2
(45) Date of Patent: Jun. 29, 2004

(54) ACOUSTIC SOUNDING (75) Inventor: Andrew Louis Martin, Ferny Creek (AU)

(73) Assignee: Tele-IP Limited, Victoria (AU)

(*) Notice: Subject to any disclaimer, the term of this patent is extended or adjusted under 35 U.S.C. 154(b) by 97 days.

(21) Appl. No.: 10/232,622

(22) Filed: Sep. 3, 2002

(65) Prior Publication Data

US 2003/0056591 A1 Mar. 27, 2003

Related U.S. Application Data

(63) Continuation of application No. PCT/AU01/00247, filed on Mar. 8, 2001.

(30) Foreign Application Priority Data

Mar. 9, 2000 (AU) .............................................. PQ6150

(51) Int. Cl.[7] .............................................. G01N 29/04
(52) U.S. Cl. ................. 73/170.13; 73/170.11; 73/587; 73/598
(58) Field of Search .................. 73/170.13, 170.11, 73/587, 598

(56) References Cited

U.S. PATENT DOCUMENTS

| | | | | |
|---|---|---|---|---|
| 4,199,246 A | | 4/1980 | Muggli ........................ 354/195 |
| 4,430,593 A | * | 2/1984 | Gohlert et al. ................. 310/327 |
| 5,208,864 A | * | 5/1993 | Kaneda ........................ 704/258 |
| 5,221,927 A | * | 6/1993 | Palmer ........................ 342/26 |
| 5,544,525 A | * | 8/1996 | Peterman et al. ......... 73/170.13 |
| 5,872,628 A | * | 2/1999 | Erskine ........................ 356/496 |
| 5,907,100 A | | 5/1999 | Cook ........................... 73/602 |
| 6,279,379 B1 | * | 8/2001 | Logue et al. ............... 73/24.01 |
| 6,368,279 B1 | * | 4/2002 | Liu ........................... 600/443 |

FOREIGN PATENT DOCUMENTS

| | | |
|---|---|---|
| EP | 0251498 A2 | 1/1988 |
| GB | 2251749 A | 7/1992 |

* cited by examiner

*Primary Examiner*—Edward Lefkowitz
*Assistant Examiner*—Andre Allen
(74) *Attorney, Agent, or Firm*—Jacobson Holman PLLC (57) ABSTRACT

Methods and apparatus for atmospheric sounding using acoustic chirps are disclosed, the transmitted and echo chirps being compared in a mixer that yields frequency sums and differences. Preferably, the mixing is performed as a complex multiplication in the Fourier domain. In one system (1) a signal generator (5) such as a PC sound card drives a loudspeaker (3) that serves as a transmitter and echo pulses are detedcted by a microphone (4) that serves as a receiver. Chirps transmitted by the loudspeaker (3) travel by different paths (7a and 7b) due to reflection from TILS or thermal inversion layers (2a and 2b) at different altitudes. The transmitted and echo chirp signals are compared in a mixer (6) from which various outputs (8 and 9) can be generated. One output (8) might be the magnitude of the difference between the transmitted and echo chirp tones, instant by instant, which is indicative of the altitudes of the respective TILs. The other output (9) might be the phase shift in an echo tone with transit time, which is indicative of vertical wind velocity at different altitudes. Such sounding methods and apparatus are useful for weather research, prediction of plume dispersal and the design of microwave links to minimize multipath fading.

14 Claims, 10 Drawing Sheets

ACOUSTIC SOUNDING

This is a Cont. of PCT/AU01/00247, filed Mar. 8, 2001 and published in English.

TECHNICAL FIELD

This invention relates to the use of acoustic pulses for atmospheric sounding or probing. It is particularly useful in measuring the height and other characteristics of thermal inversion layers [TILs] and other discontinuities in the lower atmosphere. TILs can affect radio transmission as well the transport and/or dissipation of pollutants, while other discontinuities such as windshear and clear-air turbulence near airports can affect aircraft safety.

Another technical field to which this invention may be applied is the investigation and characterization of the acoustics of buildings or the built environment.

In this specification "sound" will be used as a verb meaning to acoustically probe or explore, and "sounding" will be used as a noun to indicate the result of acoustic probing or exploration. If it is necessary to employ "sound" to mean an auditory sensation or the vibrations capable of causing such sensations or, indeed, to mean the generation of such vibrations (as in 'to make a sound'), the word "sound" will be suitably qualified to make that meaning clear.

BACKGROUND TO THE INVENTION

The conventional method of sounding the lower atmosphere is to use a radio sonde carried by a balloon to telemeter temperature and moisture measurements to a ground station that is able to track the balloon or its load by radar. This can provide accurate identification of TILs and the windshear occurring in so-called 'ducts' between adjacent TILs. The measurements are useful in weather prediction, plume dispersal prediction and in the characterisation of ducts for the siting of terrestrial microwave communications and other purposes. However, disposable radio sondes, along with their associated radar tracking stations, are expensive. They are also unsuited to frequent use near airports where such soundings are most needed.

It is known to measure the height of a TIL and the wind velocity above it by directing high energy single-tone acoustic pulses upwards at a high angle of elevation and analysing the time delays and Doppler shifts in a received signal after reflection and/or refraction in the atmosphere. A sounding system of this type was published in the Australian Engineer of October 1997 and was applied for the prediction of smokestack plume dispersal. In that system, a high-energy monotone acoustic pulse was directed at an angle to the vertical and the transit time and Doppler shift were detected by a sensitive receiver placed some hundreds of meters away. In order to obtain the necessary signal-to-noise [S/N] ratio at the receiver, a transmitted acoustic pulse of some hundreds of watts was directed through a large horn (antenna). A similar large horn had to be used at the receiver because of the large attenuation of the transmitted pulses in the atmosphere. The bulky transmitter and receiver elements had to be moved about to obtain measurements at various azimuth angles to discern the direction and velocity of the wind in the layer of interest. Such a system is obviously unsuitable in built-up areas because of the level of noise generated.

It is also known to sound or investigate the acoustic properties of a concert hall by feeding acoustic test signals through loudspeakers located on stage (or at other selected locations in the hall), detecting the signals received at various specific locations in the hall (usually in the audience seating) and analysing the received signals to determine the principal reflected signals and their contributions to multi-path distortions and reverberation times. Expensive and sophisticated computer analysis of the composite received signal by experts is necessary because of the highly complex nature of the received signal.

OUTLINE OF THE INVENTION

The present invention involves an acoustic sounding system wherein the component tones in a transmitted chirp are mixed, differenced, correlated or otherwise compared with the component tones in an echo chirp resulting from the reflection, refraction and/or scattering of the transmitted chirp. In this way, chirp transit times (and therefore the location of reflecting or refracting discontinuities in range) can be indicated as a frequency difference between the transmitted and the received chirps at any given instant. Furthermore, phase jitter or variation in an echo tone can be detected and displayed to indicate variation in velocity of the reflecting or refracting discontinuity with respect to the transmitter and/or receiver. The transmitted acoustic chirp can be generated by feeding a loudspeaker with an electrical input signal from the sound card of a computer (for example), while the echo chirp can be detected using a microphone that generates an electrical echo signal. Though the effectiveness of both loudspeaker and microphone can be enhanced by using suitable reflector dishes, the acoustic power required in the pulse is tiny in comparison to that required for the single-tone pulse of the art.

It will be appreciated, however, that many echo chirps will be generated by a single transmitted chirp because there will normally be many atmospheric discontinuities—or TILs—within range. While the comparison can be done with analog systems using known mixer circuits, they may not be able to provide the discrimination required in demanding situations. It is therefore preferable to compare the input and echo signals in the Fourier domain using DSP (digital signal processing) techniques, the Fourier-transformed digital signals being subjected to complex multiplication to yield complex sums and differences from which the difference signal is normally selected. The result can be subjected to inverse Fourier transformation to generate an amplitude vs. time series in which the amplitude coordinate is the difference component (indicative of the discreteness of the TIL discontinuity) and the time coordinate is indicative of the distance of the respective TIL discontinuity from the transmitter and receiver.

In general, the chirp should have a tonal range (ie, acoustical bandwidth) suited to the object being sounded. Low level atmospheric TILs are best sounded at the lower end of the audible range; for example, 500–5000 Hz, more preferably between 800 Hz and 3 kHz and most preferably between 1 and 2.5 kHz. On the other hand, chirps used for the sounding of concert halls will generally have a wider tonal range, or successive soundings will be made using chirps having a succession of narrow tonal ranges.

The tones in a chirp can be distributed in many ways. Most commonly, the frequency of the tones will increase or decrease linearly from the start to the end of the chirp. In this case, it is desirable to attempt to achieve a uniform rate of phase-shift from the start to the end of the chirp. Such linear chirps are more easily processed, especially using analog techniques. However, many other tonal sequences can be employed. For example, the frequencies can vary in a cosine manner, in steps or even in a random or pseudo-random manner. It is practically essential to process more complex chirps of this type using DSP and Fourier techniques.

Generally speaking, the longer the duration of a chirp the greater the potential processing gain of the system when using DSP and Fourier techniques. However, the processing power required to handle Fourier transformations and Fourier domain manipulations is also positively related to chirp duration. We have found that current readily available FFT algorithms, chips and DSP techniques known in the art cannot handle chirps much longer than about 30 s duration in a practical manner. New generation FFT chips and techniques are likely to allow chirps of more than a minute to be processed.

Another consideration affecting the duration of the chirp is whether the echo signals are to be processed in real-time or off-line. The simplest approach is to process the echo signals in real-time and to make the transmitted signal (and chirp) of sufficient duration to ensure that echo signals start arriving before the input signal has finished. In this way, the frequency difference between the tones being transmitted and received (from reflection) at any instant is indicative of the distance of the TIL causing the reflection (for a linear chirp), and, the duration of the chirp will determine the range within which TILs (or other targets) can be detected.

Comparison of the input and echo signals off-line—ie, not in real time—offers the advantage that the range of distances from which echoes are generated can be selected. Either or both the input and the echo signals can be recorded (before or after digitization and transformation) and then jointly played back with the desired time-offset to effect their comparison. For example, if signal processing considerations limit the chirp length to 15 s so that the maximum height at which TILs can be reliably detected in real time is, say, around 5000', the input signal can be delayed by, say, 15 s after the transmission of the acoustic chirp, so that TILs in the range of 5000 to 10000' can be detected using real-time echo signals by comparing the delayed signal with the echo signals arriving between 15 and 30 s after the start of the acoustic chirp.

While it will be normally desirable for the transmitted acoustic energy to be uniform over the chirp duration, or the same for each tonal increment of the chirp, the energy may be varied with respect to tone in order to compensate for anticipated frequency-selective attenuation in the environment being probed.

As indicated above, a convenient method of generating the chirp is to feed appropriate software (eg, MIDI commands) to a PC sound card so that the desired tone sequence can be generated upon command if a linear chirp is to be used, this technique allows the tone increments to be sufficiently small to create the effect of a continuous phase-shift—or smooth glissando—from beginning to end of the chirp. This input signal can be stored in a sound (wave) file in the PC and used generate repeated chirps at any desired time interval and, as already indicated, this input signal can be transmitted to a mixer for comparison with the echo signal at any desired time. Of course, acoustic chirps should not be transmitted so frequently that echoes from multiple chirps are received at the same time. If desired, a Fourier transformed input signal may be stored in the PC so that it can be fed to the comparator at the appropriate time for mixing with the transformed echo signal. This technique can reduce the real-time processing burden.

It will be appreciated that there will necessarily be direct transmission of the signal pulse from transmitter to receiver via the shortest route, as well as some indirect reflections from terrestrial objects. These 'direct' pulses may overlap the desired echoes in time at the receiver and degrade echo detection and processing. The direct pulse can be attenuated by acoustically isolating the transmitter and receiver, but this is often difficult or inconvenient. It can be subtracted from the echo chirp using known DSP techniques but, if the overlap of the direct and echo chirps is not great for the echoes of most interest, processing in the Fourier or frequency domain can effectively remove or discount most direct chirps. If the direct signals are not removed, the resulting amplitude-time display will show early high-amplitude returns that can be readily ignored in most cases.

The techniques of this invention will be of great assistance in identifying TILs that act as graded-index refractors and ducts that bend, reflect or channel microwave signals. Since these TILs and ducts tend to form within a few hundred meters of the ground in a generally predicable pattern for a given location and season. As such TILs tend to be ripple, their characterization can be vital for the optimal location and design of microwave links. A rippling reflective TIL (one that has short-term localized vertical velocities) that forms above the path of a telecommunications microwave beam will generate rapidly fluctuating multi-path signals at the microwave receiver, causing signal fading and data loss. Using the techniques of the invention, the rippling of the TIL can be displayed as phase jitter. Where short-term vertical air movements are important (eg, when atomspheric turbulence is of concern), the phase jitter may be the main subject of the sounding.

Thus, use of the techniques and apparatus of this invention for low-level atmospheric soundings permits the identification and quantification of windshear and CAT (clear air turbulence). In this context, windshear indicates the relatively sudden change in direction or velocity of wind with a relatively small change in elevation. Such changes most usually occur at TILs and it is quite common for a layer of wind that is sandwiched between upper and lower TILs, to have properties—such as velocity, speed, direction, temperature, moisture content or the like—that differ markedly from those of the air bodies above and below the TILs. Windshear can be a problem for aircraft if it is severe and in the vicinity of a runway. While CAT can be regarded as a special case of windshear, the term is generally reserved for localised non-layered turbulence. Such turbulence has been reported in the wake of large jet airliners as they approach landing or after they take off. CAT of this nature has been blamed for the crashes of light planes landing or taking off immediately following a large airliner. Since CAT is evidenced by local variations in air density and/or temperature as well as velocity, it will refract and reflect beamed acoustic pulses and, therefore be amenable to identification and quantification using the methods and apparatus of the present invention.

The use of chirped acoustic sounders aligned with and cross-runway such that the chirped pulses are directed at a low elevation allows windshear and CAT in the vicinity of a runway to be identified. Preferably, mirrored transmitter and receiver sets are used in each direction so that pulses can be transmitted first in one direction and then in the other. The height of the windshear or CAT can be estimated by the time delay between transmission and reception of the reflected or refracted pulses, while the velocity of the associated body of air in the pulse-beam direction can be estimated by comparing the differential time shifting of the 'up' and 'down' pulses. The component time-delay measurements that allow the differential comparison can each be obtained using the techniques indicated above, yielding a highly accurate measurement of wind velocity or turbulence at any desired height within range. In general, chirp transit-time measurements conducted in this way will be more accurate than Doppler-based measurements.

As also mentioned above, the chirped acoustic pulse techniques offer substantial benefits in the characterisation of concert hall acoustics, though the chirp duration will generally be shorter and the chirp bandwidth higher than for atmospheric sounding. This allows highly precise measurement of the length of the principal multiple paths between a chirped pulse transmitter at a given location to a given receiver location, which then allows computation of multipath interference for those locations over the range of audible tones. Such measurements and computations then provide most valuable inputs into the correction or optimisation of an existing concert hall.

The invention can be embodied in apparatus, systems or methods for acoustic sounding in air.

DESCRIPTION OF EXAMPLES

Having portrayed the nature of the present invention, particular examples will now be described with reference to the accompanying drawings. However, those skilled in the art will appreciate that many variations and modifications can be made to the chosen examples without departing from the scope of the invention as outlined above. In the accompanying drawings.

The examples of FIGS. 1–7 are concerned with an acoustic sounding system and method for determining the level of TILs over a planned microwave link for the purpose of optimal tower and antennae location, having regard to anticipated multipath fading caused be reflection or refraction from the TILs. It will be assumed that the TILs of most concern will be those between 800 m to 1400 m' high.

Figure 1:
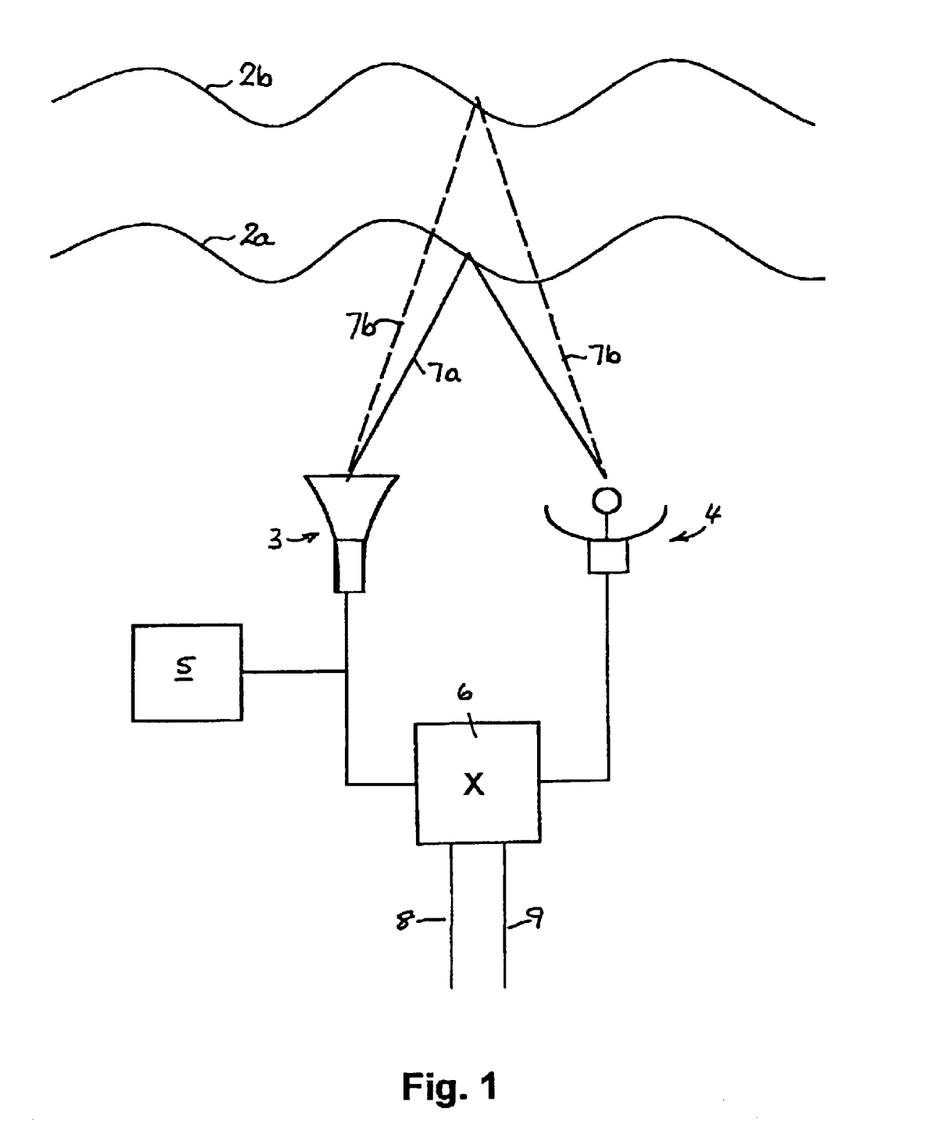
FIG. 1 is a simple block diagram showing the principal components of an acoustic sounder for use in detecting TILs below 3000'.

The principles of the acoustic sounding system 1 of the present example will be explained with reference to the simple diagrams of FIGS. 1 and 2. It will be assumed that a pair of TILs 2a and 2b define a duct D in the atmosphere above system 1, both TILs being shown rippled. If such TILs and ducts are common or persistent at levels around 1000 m, they can cause serious multipath fading of microwave signals transmitted between repeater towers (not shown).

System 1 includes (i) a transmitter 3—a loudspeaker directed vertically upwards—(ii) a receiver 4—a microphone and reflector dish also pointed vertically upwards—receiver 4 being located on the same site as transmitter 3 but a few meters away therefrom, (iii) an input signal generator 5 and (iii) an electronic mixer or comparator circuit 6. Input signal generator 5 generates electronic input signals (chirps) that are conveyed to both transmitter 3 and mixer 6. These input signals result in acoustic chirps being transmitted from transmitter 3 and echo chirps being received by receiver 4. The path of chirps generated by transmitter 3 and reflected from the lower TIL 2a is shown by unbroken line 7a while the path of a pulse reflected from upper TIL 2b is shown by broken line 7b. Echoes received by receiver 4 are converted into electronic echo signals and fed to mixer 6. Mixer 6 is shown as having two outputs, indicated as 8 and 9. Output 8 indicates the magnitude of an echo, while output 9 indicates the phase shift in the echo, both outputs being a time series indicating successive echoes from successively greater altitudes. The phase shift signal indicates the vertical velocity of atmospheric discontinuities—or turbulence—at the altitude of the echo.

Figure 2:
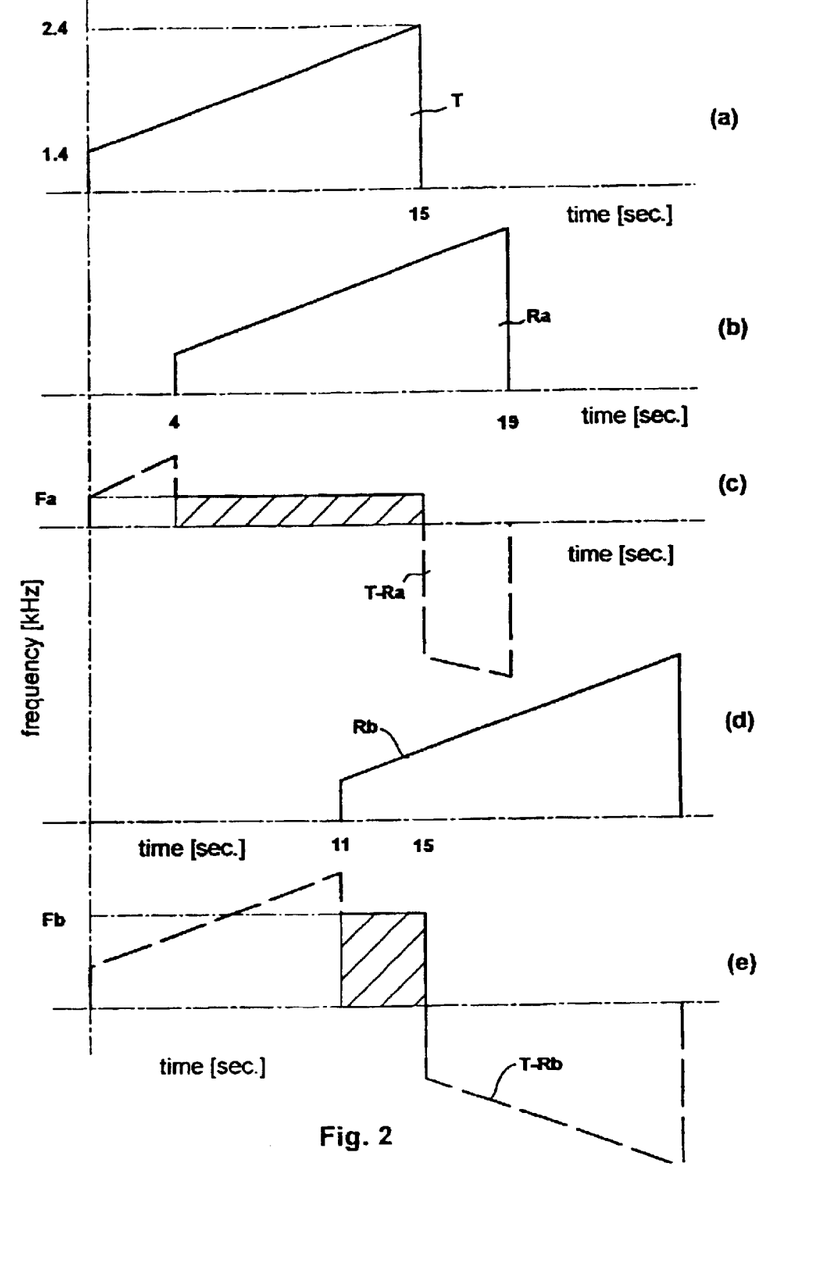
FIG. 2 is a set of graphs showing a simple process whereby a transmitted chirp (a) can be combined with echo chirps (b) and (d) to generate useful outputs (c) and (e).

FIG. 2 is a series of graphs illustrating, in a simplified way, the manner in which a chirp T from transmitter 3, a first echo chirp Ra reflected from TIL 2a and a second echo chirp Rb reflected from TIL 2b can be processed to yield an output signal indicative of the height of the TIL layers. Chirp T is assumed to be of 15 seconds duration and increases linearly in audio frequency from 1.4 kHz to 12.4 kHz. It is repeated at intervals of not less than 15 seconds between chirps. Received echo chirps Ra and Rb are shown as if they had not been attenuated during transmission and reflection through the atmosphere whereas, in practice, they will be substantially attenuated and contain significant noise. However, those skilled in the art will appreciate that the amplitudes of the transmitted and received pulses can be automatically adjusted or 'normalized' so as to be comparable.

A simple method of processing the chirps to derive distance information is to (i) sample each using a common clock, (ii) detect each audio tone received and (iii) subtract the detected tone(s) from the tone of the transmitted chirp during each sample period. This can be done for the entire duration of the transmitted chirp or for only that portion of the transmitted chirp corresponding to the altitude range of particular interest. Thus, subtracting the detected tone of received chirp Ra from the tone of transmitted chirp T, instant by instant, will yield a signal T-Ra of the type shown in graph (c), the dashed lines indicating the portion of chirp Ra that is normally ignored or discarded by mixer 6 because it occurs after the end of transmitted chirp T. It will be seen from graph (c) that from 0–4 s only the tones of input chirp T are received (direct from signal generator 5) but, from 4–15 s the rising tones of chirp Ra are detected and are subtracted from the tones of chirp T to yield a constant difference tone Fa (shown hatched) that is indicative of the height of TIL 2a and appears as an output signal on line 8.

After 11 s, the tones of chirp Rb start to be detected. Being near the start of echo chirp Ra, these low frequency tones are easily discriminated from the high frequency tones near the end of chirp T. Thus the tones detected from Rb can be separately subtracted by mixer 6 from those of chirp T to yield a difference tone Fb that persists from 11–15 s, as shown by the hatched area of graph (e). Fb is, of course, indicative of the height of TIL 11b and appears as an output signal on line 8 some time after the appearance of Fa on line 8. The amplitude of signals Fa and Fb (not shown in FIG. 2) are indicative of the reflectivity of TILs 2a and 2b and their timing is indicative of the altitudes of the TILs. The dashed portion of graph (e) indicates the form of the processed signal T-Rb if chirp Rb was the only one received and if the whole of chirps T and Rb were taken into account by mixer 6. In fact, it would be normal for mixer 6 to ignore (ie, equate to zero) all tones of chirp T received when no tone is detected by receiver 4, and, to ignore all tones detected by receiver 4 before and after the transmission of chirp T.

From graphs (a), (b) and (c) of FIG. 2, it will be seen that there are 11 s during which the tones of Ra can be processed to yield signal Fa on output 8, but there are only 4 s during which the tones of Rb can be detected and processed to yield output Fb. If chirps are transmitted every 20 s, three sets measurements can be taken every minute and added to the integration of Fb to improve its accuracy. Should more accuracy be required in measuring the height of TIL 2b, a replica of input signal or chirp T can be generated, delayed by say 7 s, and then compared with received chirp Rb to provide an overlap of 11 s; the added 7 s delay being taken into account when calculating the height of TIL 2b.

An indication of the range of sounder 1 employing a 15 s chirp can be had by assuming for convenience that the speed of sound in air approximates 1000 ft/s and that the echoes of interest must be received between second 4 and second 11 of the transmitted chirp to allow effective analysis. Thus the altitude range that can be encompassed will be between 2000' and 5500'. It will also be appreciated by those skilled in the art that, if the input signal and the echo signal are sampled at a high rate (say 44.1 kHz) and each sample is it is fed through an A/D converter and digitized and the thus digitized input and echo signals are subjected to Fourier transformation, the mixing or comparison of these signals can be effected in the Fourier domain, resulting in very high processing gains and accurate measurements well below 2000'.

Figure 3:
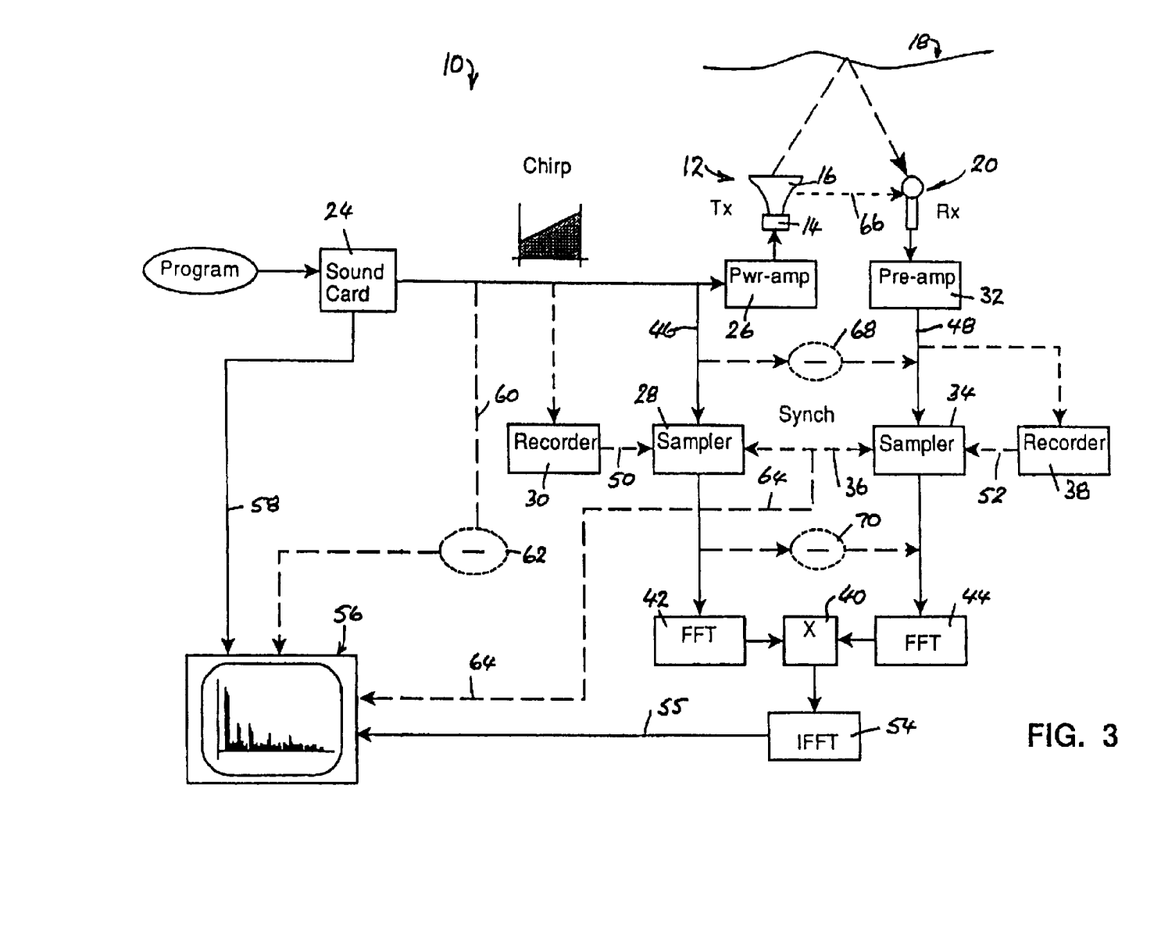
FIG. 3 is a more detailed block diagram of a sounding system employing Fourier domain comparison or mixing.
Figure 4:
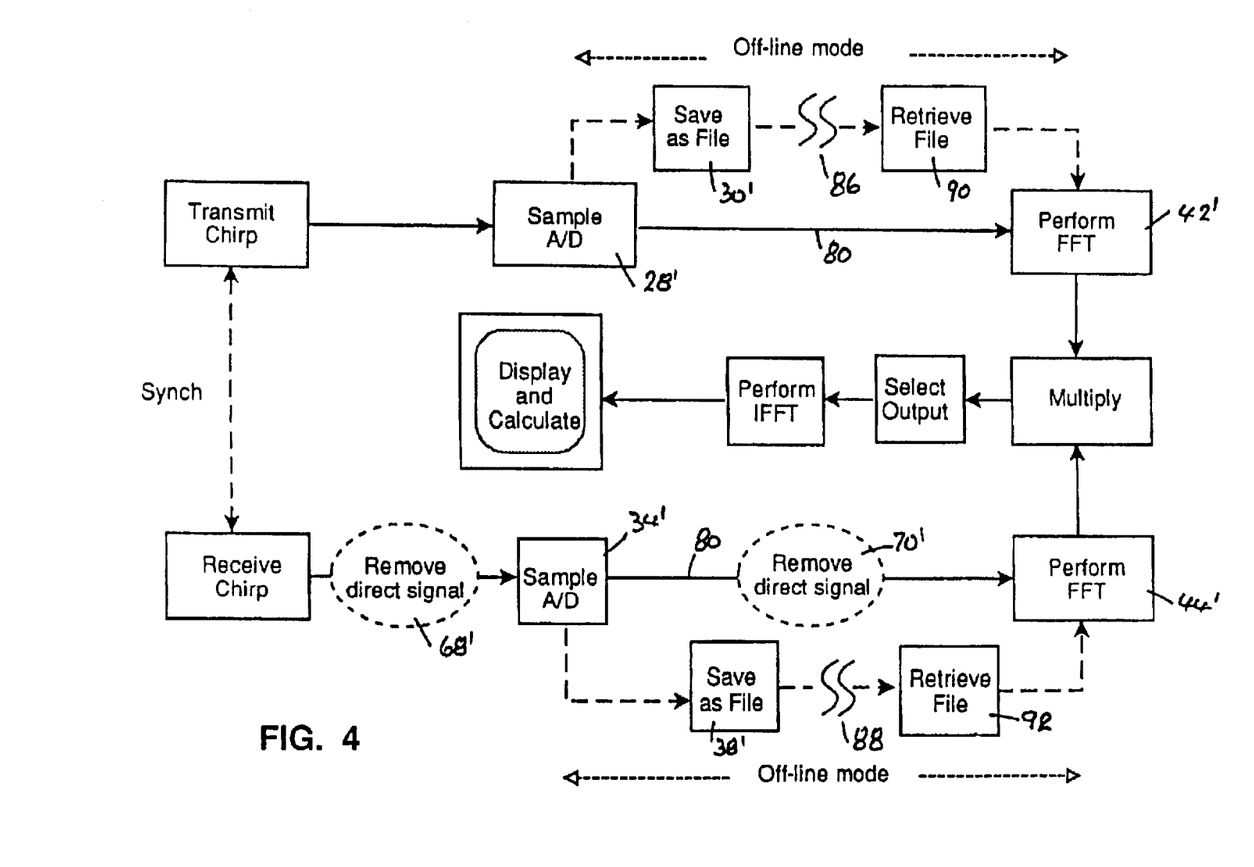
FIG. 4 is a flow-chart depicting a procedure for Fourier-domain processing of the transmitted and echo chirps in the system of FIG. 3.

Referring now to FIGS. 3 and 4, an embodiment will now be described that compares the transmitted and received pulses using Fourier techniques. A PC (personal computer) can be used to implement chirp-generation software that produces a linear-sweep cosine analogue chirp signal of a 1 kHz range, from 1.4 kHz to 2.4 kHz, such that the phase of the signal increases linearly over a period of 15s, which is the duration of the chirp in this example. This analogue signal is output from the sound card 24 of the PC to an audio power amplifier 26 that drives loudspeaker 14 and is sampled by sampler unit 28 at about 44.1 kHz. Each sample is converted into a digital code indicative of the phase and amplitude of the signal of the sample. If desired, the output analogue chirp signal and/or the digital output of sampler 28 is/are recorded in recorder 30, but it will be appreciated by those skilled in the art that it will be convenient to implement such recordings by saving the analogue and/or digital signals to RAM or to disc as computer-readable files.

The returned analogue signal detected by microphone 20 is amplified in a preamplifier 32 and sampled and digitized (phase and amplitude, preferably) by sampler 34, preferably at the same rate (44.1 kHz) and using the same A-D coding (eg, 16 bit) as employed for the output chirp was by sampler unit 28. Preferably, the sampling of the received signal by unit 34 is initiated at the start of the transmission of the chirp, or after a predetermined delay. The broken line 36 illustrates this synchronization, though it will be appreciated that the synchronization signal indicating the start of a transmitted chirp can be generated by the PC rather than by employing detector means (not shown) in sampler unit 28 to identify the start of a chirp. As with the transmitted signal, the received signal can be recorded by recorder 38 in analogue form from the output of preamplifier 32 or as the sampled and digitized signal output by sampler 34. Again, it may be convenient to implement the recording within the PC using RAM or disc storage media. In fact, most system functions can be PC implemented.

In this example, comparison or correlation of the transmitted and received chirps is effected in the Fourier domain by multiplying the Fourier transform of each pair of samples using a multiplier unit 40 of a type known in the art. In this example, transformation of each successive sample of the outgoing chirp is effected by a Fourier transformer 42 that employs a FFT algorithm and each successive sample of the received signal is transformed in a similar fashion using transformer 44. It will be appreciated that FFT devices 42 and 44 can be implemented in hardware or in software, both of which are available commercially. Hardware devices, usually being significantly faster than software devices, will usually be preferred if the transformation is to be conducted in real time (as indicated by arrows 46 and 48). However, an FFT algorithm can be implemented in software by the PC and may be preferred for cost reasons, but this may require that the transformations are effected off line. This is indicated by broken arrows 50 and 52 indicating that the recorded signals are fed from recorders 30 and 38 via samplers 28 and 40 to FFT devices 42 and 44, respectively.

As already indicated, complex multiplier 40 will generally yield both a positive and a negative results, only one of which is required. If desired, the selected output of multiplier 40 can be displayed in the Fourier domain relative to time or sample number on a suitable CRT or other display device to indicate detected TILs. However, such Fourier charts are not readily interpreted by non-specialists and it will be generally preferably to perform and inverse Fourier transform on each complex product output from multiplier 40 using an inverse FFT device 54 to yield a voltage of proportionate amplitude in the time domain, which can be fed (via line 55 as indicated in FIG. 3) to a display device 56 (normally the screen of the PC) and shown thereon as a Y-axis histogram or vertical bar. The X-axis of display 56, representing time or sample number, can be derived directly from the computer (via line 58), from the output chirp signal on line 60 and an auto-correlator 62, or via a synchronising signal on line 64 derived from line 36.

It will also be appreciated that a high amplitude direct chirp signal, indicated by broken-line arrow 66 in FIG. 3, will be received by receiver 20 almost immediately upon transmission, since the distance between transmitter 16 and receiver 20 is only a few meters. This direct signal could be removed to enhance the overlapping lower amplitude signals received from TILs such as 18 by auto-correlation and other techniques in device 62, in an analogue device 68 connected between the transmitter and receiver sections prior to samplers 28 and 34, or in a digital device 70 connected between the transmitter and receiver sections after samplers 28 and 34. However, as previously indicated, removal of the direct signal from the received signal is generally not necessary nor very advantageous because the comparison of the transmitted and received signals in the Fourier domain accomplishes that task to a remarkable degree. However, during the time between the start of reception of the direct and indirect signals, there will be a large resultant net signal due to the directly transmitted chirp. So long as the sampling and digitisation processes are capable of handling the large amplitude signal, no deleterious interference between the signals should be found. A sampling rate of at least 30 kHz and 32 bit digitisation are desirable, but not essential for this purpose.

FIG. 4 is a flow chart indicating the actions described above as a time sequence This chart will be self explanatory to those skilled in the art. Lines 80 and 82 indicate the real-time analysis option in which the results from the sampling steps 28' and 34' are input directly to the respective FFT transform steps 42' and 44'. Discontinuities 86 and 88 indicate the variable time lapse between sampling steps 28' and 34' and the performance of the FFT transforms in steps 42' and 44'. This time lapse is permitted by first recording the sampled transmitted and received signals in recording steps 30' and 38' and then, at some later time indicated at 86 and 88, retrieving the sound files in steps 90 and 92 and performing respective FFTs in steps 42' and 44'. Optionally, but by no means necessarily as indicated above, the direct signal transmitted on path 66 (FIG. 3) could be removed from the received analogue signal in step 68' and/or from the sampled digital signal in step 70'. This may be done by auto correlation methods or simply by system calibration conducted when there are no TIL reflections, or when the reception of such reflections is delayed beyond the duration the direct signal on path 66. It has been found that removal of the direct signal in this manner seldom offers significant advantage because the processing gain of the system is so high.

The sampling rates and chirp duration indicated in the above example can provide processing gains of around 55 dB, permitting a precision of measurement of about one meter in 500. It will be appreciated that this is greatly superior to that which can be achieved by the simple pulse timing methods of the prior art.

Figure 5:
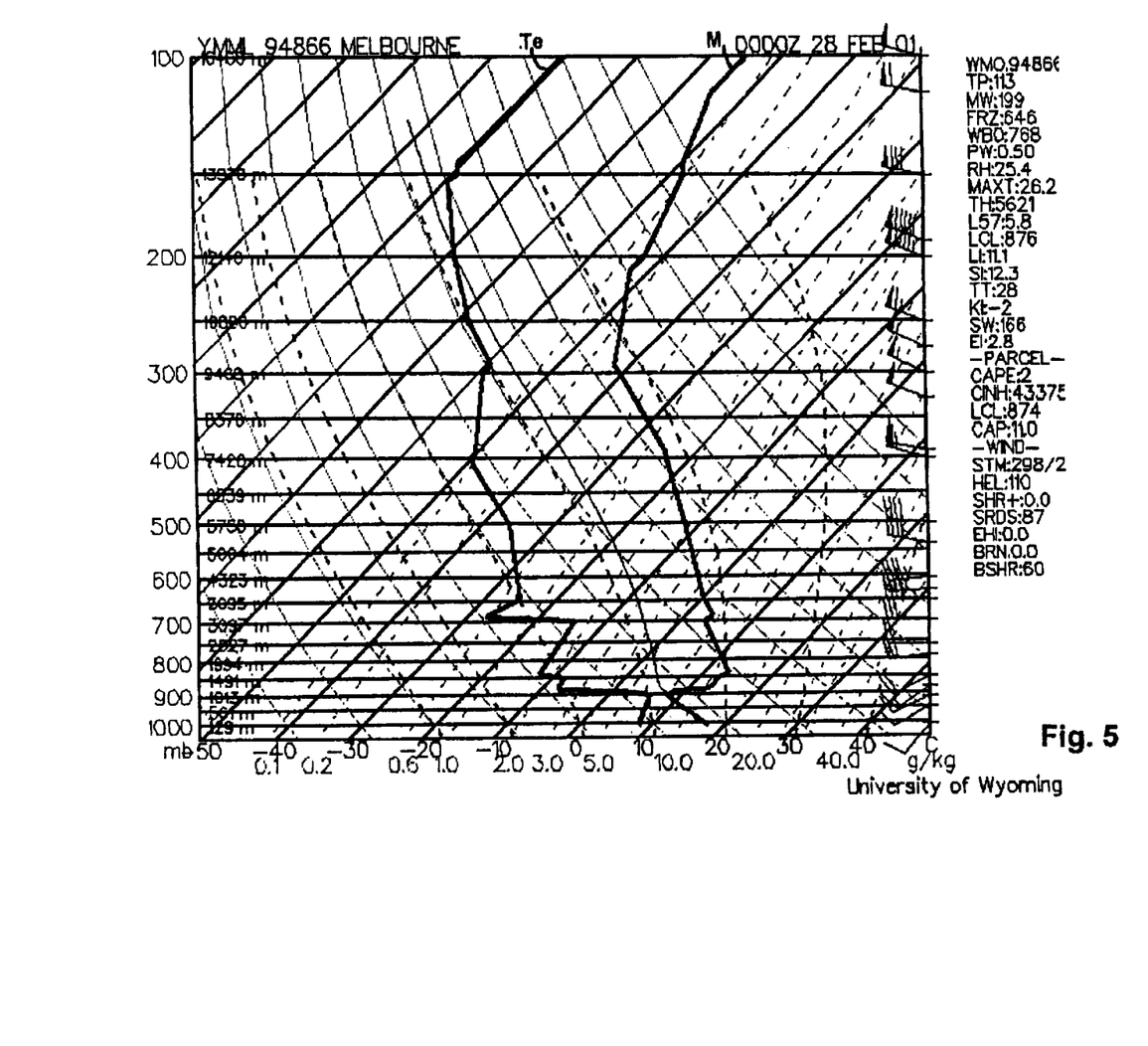
FIG. 5 is a graph, derived from radiosonde measurements, showing variation of air temperature (Te) and moisture (M) with altitude at Melbourne, Australia, on Feb. 28, 2001.
Figure 6:
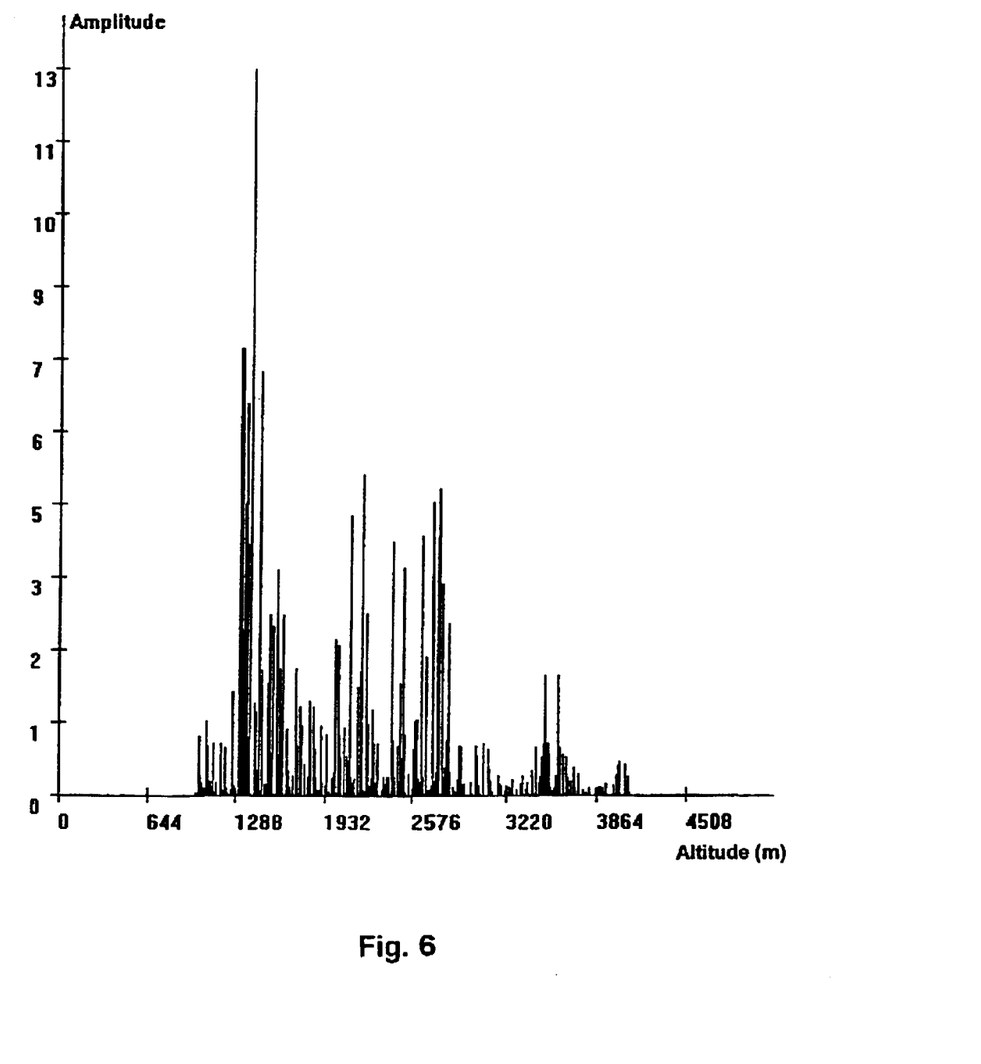
FIG. 6 is a graph charting output signal amplitude with respect to altitude derived from the system of FIG. 3 at Mulgrave (a Melbourne suburb) on Feb. 28, 2001.

FIG. 5 is a standard graph of radio-sonde data collected at Melbourne airport in the morning of Feb. 28, 2001 and posted on the Internet by the University of Wyoming. It depicts the variation of temperature Te and moisture M with height. It will be seen that there is a major temperature discontinuity between about 1013 and 1200 m, a minor inversion at 1491 m and a major inversion at about 3000 m. FIG. 6 is an actual plot of the type indicated at 36 in FIG. 3 charting reflection amplitudes against altitude taken on in the afternoon of 28 February at Mulgrave (a Melbourne suburb about 40 km from the Melbourne airport). It will be seen that, for the purpose of predicting the location of TILs and their relative reflective strength, the graph FIG. 6 offers much greater detail than that of FIG. 5. While the major discontinuity around 1200 m is still dominant, the simple inversion between 1400 and 3000 m in graph 5 is revealed as a much more complicated structure in the graph of FIG. 6, showing a likely duct between 1950 and 2700 m. Though much of the fine detail shown in FIG. 6 will not be of relevance to the design of a microwave link, it will be of significant interests to meteorologists, those concerned with plume and pollution dispersal and to atmospheric researchers generally.

Figure 7:
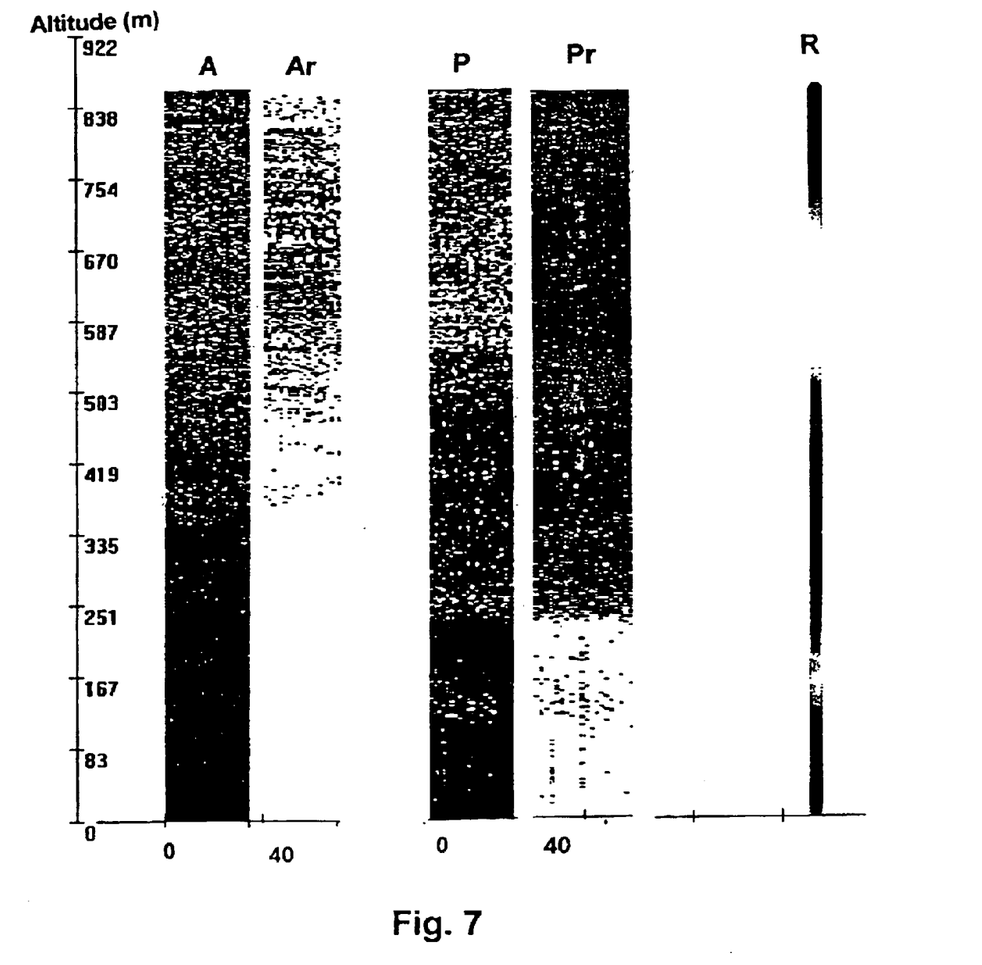
FIG. 7 is a black and white reproduction of a series of color graphs of reflections obtained from TILs at various altitudes for many repeated soundings taken over 40 minutes on Feb. 28, 2001 at Mulgrave; graph A showing color-coded amplitude data; graph Ar showing the red (high amplitude) component of graph A; graph P showing color-coded phase data; graph Pr showing the red (high phase) component of graph P; graph R being a reference color spectrum.

The graphs of FIG. 7 illustrate the results of repeated soundings taken on Feb. 28, 2001 using 15 s chirps taken over a 40-minute sampling period using the system of FIGS. 3 and 4. Graph A shows amplitude variation with height and graph P shows phase variation with height. The echo signals have been arbitrarily clipped to a transit times corresponding to an altitude of about 900 m. These graphs are reproductions of color graphs that, unfortunately, loose much of their detail in black and white. In the color version, bar R is a reference spectrum in which blue is at the bottom and red at the top with yellow and green between. In graph A, most of the portion below 250 m (the boundary layer) is blue showing low echo amplitudes (i.e., few significant thermal discontinuities). Graph Ar shows the red and near-red components of graph A and reveals an area of high reflectivity (large thermal discontinuities) between about 550 and 800 m. In graph P, most of the region below the boundary layer is blue, showing a low phase shifts and, therefore, low vertical wind velocities. Graph Pr shows the red and near-red components of graph P indicating significant turbulence above the boundary layer. Again, such graphs will be of interest to many others besides those who wish to pin-point the causes of multipath fading in a microwave link.

The method of the invention can be used to indicate the direction and velocity of upper level winds, the windshear at various heights and/or CAT in the flair-out zone near the start of an airport runway. Such an application will now be described with reference to FIGS. 8–10.

Figure 8:
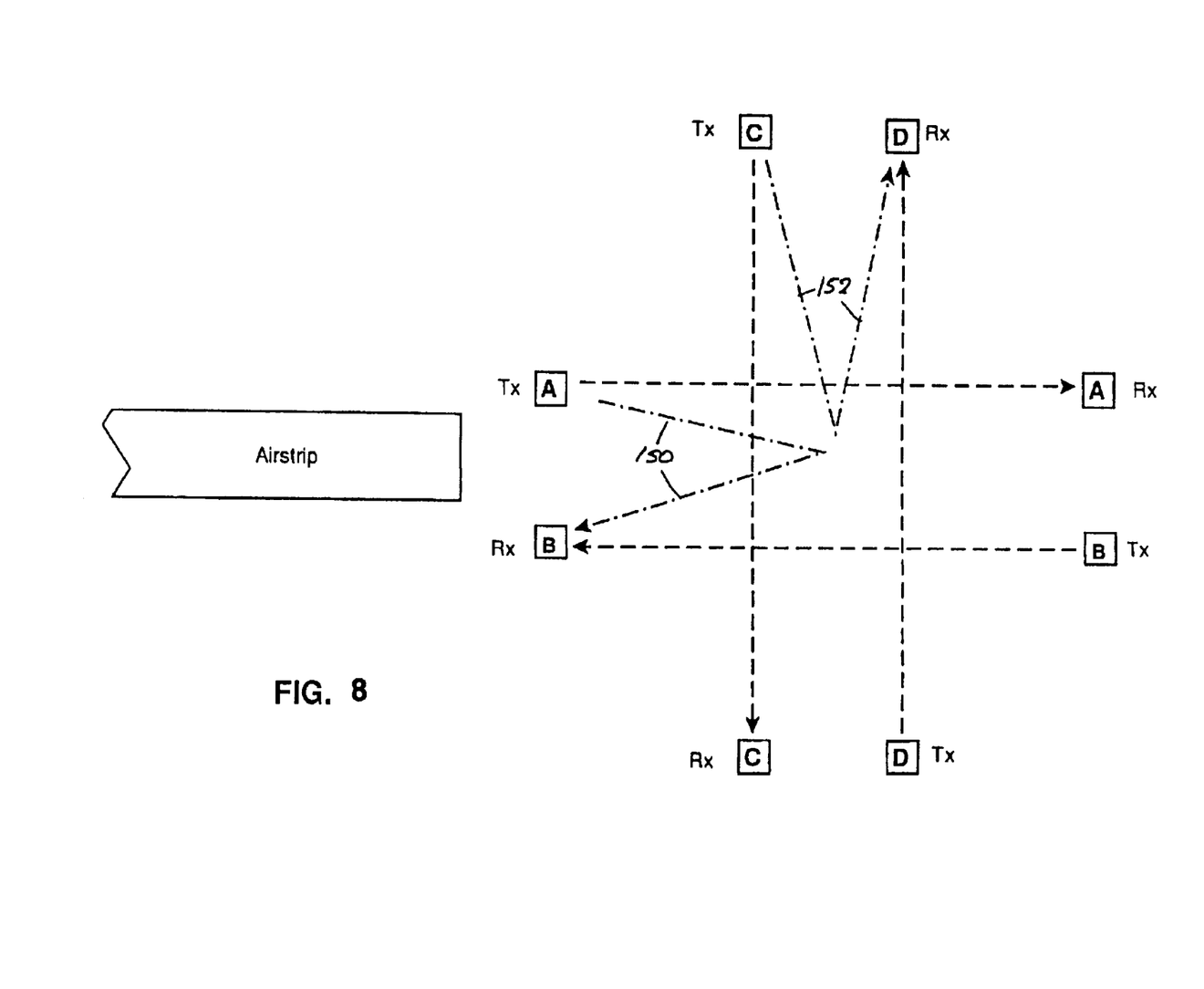
FIG. 8 is a diagrammatic plan view of one end portion of one runway of an airport showing the location of two pairs of chirp transmitters and receivers for measuring the height of a duct and the wind velocity and direction (windshear) therein.
Figure 9:
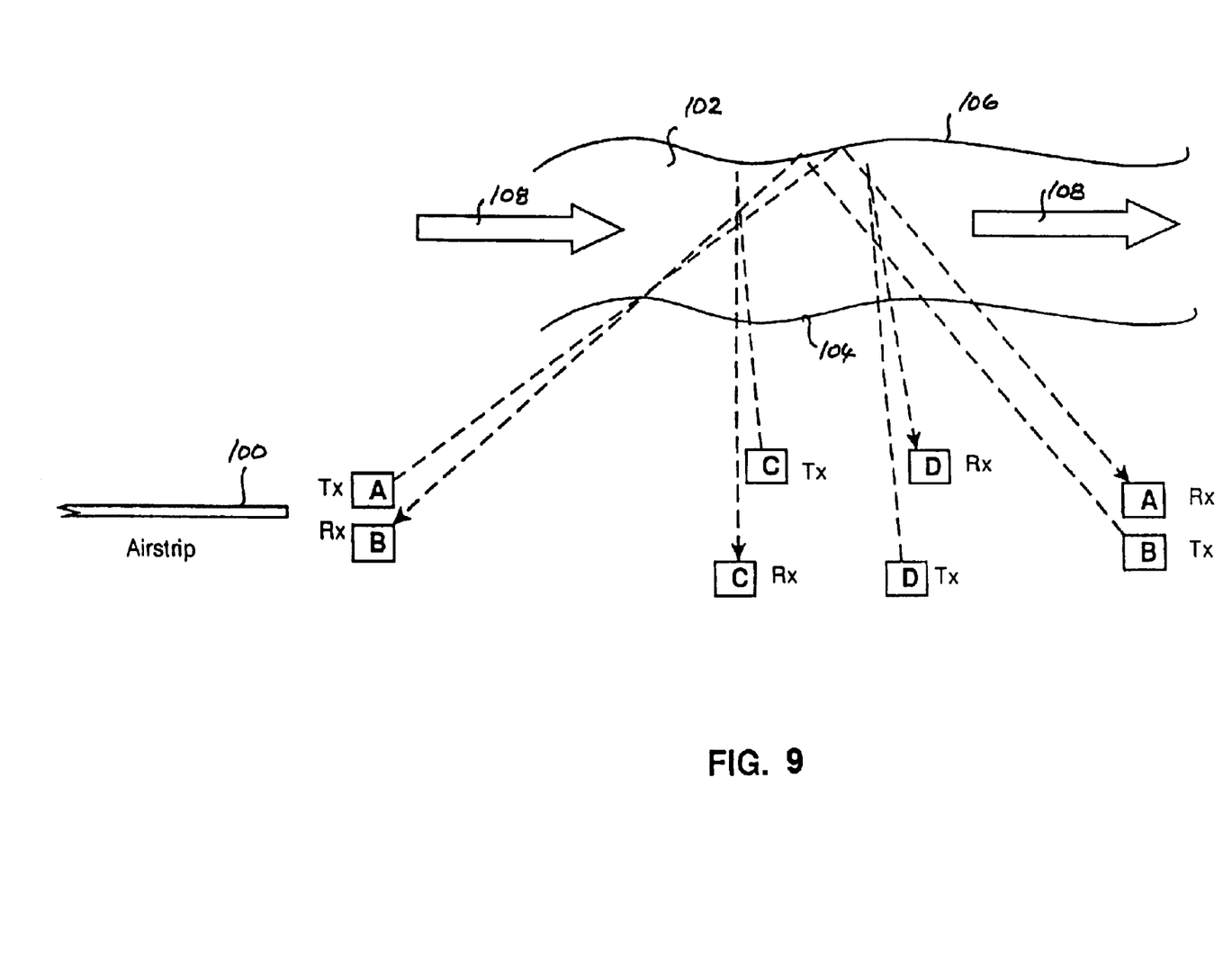
FIG. 9 is a diagrammatic elevation of the portion of the runway of FIG. 8 taken on section line XI—XI of FIG. 8 and showing the refraction or reflection of sound beams within a duct above the airport.

In this example, two chirp transmitter and receiver pairs, indicated as A and B are located at the end of runway 100, the transmitters and receivers being separated by about 1–2 km and arranged so that the transmission paths are aligned with the runway 100 and the transmitters and receivers are arranged so that the chirp signal from transmitter A travels away from runway 100 while the signal from B travels toward the runway. A second transmitter-receiver pair, indicated as C and D is located some distance from the end of runway 100 so that its signals are transmitted in opposite directions across those of transmitters A and B. The directions of chirp transmission are indicated by broken-line arrows. FIG. 9 is a diagrammatic elevation of the arrangement of FIG. 8 showing the presence of a duct 102 formed between a lower TIL 104 and an upper TIL 106. While the wind direction (windshear) in duct 102 is indicated by arrows 108, it is to be understood that the wind direction is not in line with the runway 100 but at an angle to it.

Figure 10:
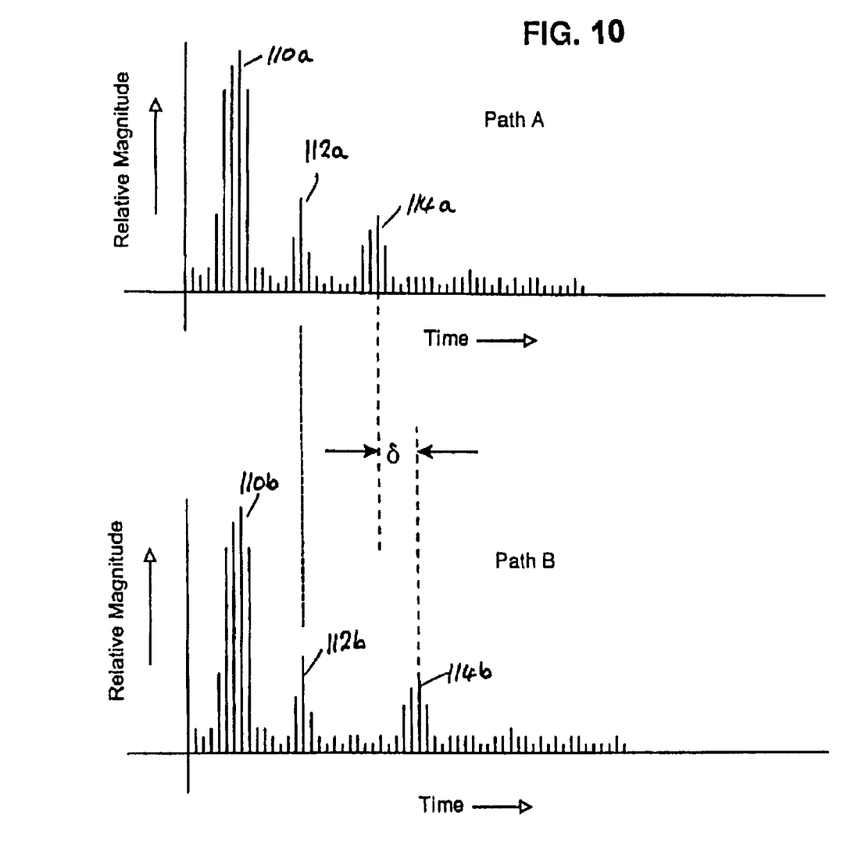
FIG. 10 shows the charts produced by the two pairs of transmitters and receivers aligned with the runway on section line XI—XI of FIG. 6.

It will be appreciated that the portions of acoustic signals from transmitters A that are reflected from lower TIL 104 will not be affected by windshear in duct 102, but the portions of these signals which are reflected from upper TIL 106 will have been advanced or delayed by the windshear. Specifically, the signal from transmitter A will have been advanced or accelerated by wind 108 while the signal from transmitter B will have been delayed by wind 108. FIG. 10 shows the resulting displays for paths A and B derived in the manner described above. Peaks 110*a* and 110*b* are the direct signal peaks and peaks 112*a* and 112*b* are those resulting from reflection of the signals from lower TIL 104. Peaks 110*a* and are 110*b* are the same distance from the origin of their respective charts, as are peaks 112*a* and 112*b* indicating that there is no wind at altitudes below TIL 104. However, the peaks 114*a* and 114*b* will be at different distances from their respective origins because signals on path A have been accelerated while those on path B have been retarded by wind 108. The difference, indicated as a, is indicative of the wind velocity down-runway. [Should peak 114*b* be closer to the origin than 114*a*, an up-runway wind in duct 102 would be indicated.] A similar pair of measurements derived from cross-signals on paths C and D will indicate the cross-runway direction and wind speed in duct 102. The two readings combined, then provide the strength and bearing of the wind in duct 102.

Generally, it is only low level (below 300 m) ducts and CAT that will be of concern to light aircraft. If the transmitter and receiver pair are separated by at least 2 km, they can be angled below or near the Brewster angle where strong reflections can be anticipated. This, coupled with the large processing gains available by the chirping techniques disclosed herein, can provide precise and instantaneous measurement of windshear and CAT at the approach to airport runways without any danger of physical or electronic interference with landing aircraft.

On somewhat rare occasions in thunderstorms or hail storms vertical windshear can occur in which there is a strong downdraft of air associated with more diffuse updrafts. A downdraft that occurs in the approach or flair-out zone of a runway can have disastrous results for small aircraft and even for large or heavily loaded aircraft attempting to land or take off. It would be desirable to also measure this vertical windshear. A convenient way of achieving that is to arrange for the receiver of path B to receive and process any reflections of signals from transmitter A caused by vertical windshear. Similarly, the receiver of path D could listen for any reflections from the signals of transmitter of path C. This possibility is indicate by signal paths drawn in dot-dash lines in FIG. 8 and identified as 150 and 152 respectively. While it is also envisaged that receiver of path A could also listen for reflections from the transmitter of path B, and the receiver of path C could listen for reflections of the signal from path D, the signal paths have not been shown for the sake of simplicity.

While some examples of the application of the invention have been described, it will be appreciated that the methods of the present invention can be applied widely to acoustic sounding and that many alterations and additions can be made without departing from the scope of the invention as outlined above.

What is claimed is:

1. A method of locating temperature and/or velocity discontinuities in the lower atmosphere, comprising the steps of:
   generating an input signal comprising a chirp including a sequence of different audio tones,
   employing said input signal to drive an acoustic transmitter to effect the transmission of an acoustic chirp into the atmosphere,
   receiving and detecting an acoustic echo from said transmitted acoustic chirp and generating an echo signal comprising at least a portion of said sequence of tones,
   comparing the sequence of tones in the input signal with the time-shifted sequence of tones in the echo signal and deriving a first output signal indicative of the time delay between transmission of the transmitted chirp and detection of said echo, said time delay also being indicative of the location of a discontinuity in the atmosphere.

2. A method according to claim 1 including the step of:
   comparing tones in the input signal with corresponding tones in the echo signal and deriving a second output signal indicative of the phase shift between a tone in the input signal and the corresponding tone in the echo signal, said phase shift also being indicative of the velocity at which said discontinuity is moving in the direction of travel of the acoustic chirp.

3. A method according to claim 1 including the steps of:
   mixing the tones of the input signal with the tones of the echo signal to obtain, as said first and/or second output signal, the sum and/or difference frequencies of the mixed tones.

4. A method according to claim 1 including the steps of:
   subjecting the tones of the input signal to a Fourier transformation to form a Fourier input signal,
   subjecting the tones of the echo signal to a Fourier transformation to form a Fourier echo signal, and
   combining said Fourier input and said Fourier echo signals to obtain said first and/or second output signals or a precursor thereof.

5. A method according to claim 1 including the steps of:
   sampling the input signal at intervals to generate a series of digital samples of the input signal,
   sampling the echo signal at the same intervals to generate a series of digital samples of the echo signal,
   deriving the Fourier transform of the series of digital samples of the input signal to generate a Fourier input signal,
   deriving the Fourier transform of the series of digital samples of the echo signal to generate a Fourier echo signal, and
   combining said Fourier input and said Fourier echo signals to obtain a Fourier output signal indicative of the time and phase shifts in the echo signal with respect to the input signal.

6. A method according to claim 5 including the steps of:
   subjecting said Fourier output signal to an inverse Fourier transformation to obtain a time sequence of amplitudes indicative of the magnitude of the respective discontinuities in the atmosphere traversed by said acoustic chirp.

7. A method according to claim 1 including the steps of:
   modulating the input signal to generate an acoustic chirp in which the component tones increase or decrease in frequency uniformly with respect to time,
   for each one of a series of time intervals during the transmission of the acoustic chirp, comparing the tone of the input signal during that interval with the tone of the echo signal during the same instant to obtain said output signal.

8. A method according to claim 1 including the steps of:
   modulating the input signal to generate an acoustic chirp in which the component tones increase or decrease in frequency uniformly with respect to time,
   storing or recording the input signal,
   after a predetermined time following initiation of the transmission of the acoustic chirp, playing the stored or recorded input signal as a delayed input signal, and
   for each one of a series of time intervals during the playing of said delayed input signal, comparing the tone of the delayed input signal during that interval with the tone of the echo signal during the same instant to obtain said output signal.

9. A method according to claim 1 including the steps of:
   generating the acoustic chirp from a stored input signal,
   recording the echo signal,
   replaying the stored input and recorded echo signals in a predetermined time relationship,
   for each one of a series of time intervals during the replaying of said stored and recorded echo signals, comparing the tone of the stored input signal during that interval with the tone of the replayed echo signal during the same instant to obtain said output signal.

10. Apparatus for use in atmospheric sounding comprising:

means for generating and input signal comprising a chirp that includes a sequence of different audio tones, an acoustic transmitter connected to said generating means adapted to effect the transmission of an acoustic chirp into the atmosphere upon receiving said input signal, means for receiving and detecting an acoustic echo from an acoustic chirp transmitted into the atmosphere by said transmitter, said receiving means being adapted to generate an echo signal comprising at least portion of said sequence of tones, and comparator means connected to said generator means for receiving said input signal and connected to said receiving means for receiving said echo signal, said comparator means being adapted to compare the tones in said input signal with the tones in said echo signal as they are received and to derive a first output signal indicative of the frequency difference there between.

11. Apparatus according to claim 10 wherein said comparator means is adapted to compare tones in the echo signal with the corresponding tones in the input signal and to generate a second output signal indicative of the phase difference between said compared tones.

12. Apparatus according to claim 10 wherein said comparator includes a mixer connected to receive the input signal and the echo signal, said mixer being adapted to generate said first and/or second output signals.

13. Apparatus according to claim 10 wherein:

first Fourier transform means are provided for effecting the Fourier transformation of the input signal, thereby generating a transformed input signal, second Fourier transform means are provided for effecting the Fourier transformation of the echo signal, thereby generating a transformed echo signal, said comparator comprises a complex multiplier adapted to multiply said transformed input signal and said transformed echo signal to generate a complex output from which said first and/or second outputs can be derived.

14. Apparatus according to claim 13 comprising inverse Fourier transform means connected to receive said complex output and to generate said first and/or second output.

* * * * *